United States Patent [19]

Katta et al.

[11] Patent Number: 5,578,584
[45] Date of Patent: Nov. 26, 1996

[54] FEED CONTAINING GALACTO-OLIGOSACCHARIDES FOR DOMESTIC FOWLS

[75] Inventors: Yasuo Katta; Shigeru Wakabayashi, both of Hyogo-ken, Japan

[73] Assignee: Matsutani Chemical Industry Co., Ltd., Kyogo-Ken, Japan

[21] Appl. No.: 216,282

[22] Filed: Mar. 23, 1994

[30] Foreign Application Priority Data

Mar. 24, 1993 [JP] Japan ................................. 5-065241

[51] Int. Cl.$^6$ ................................. A61K 31/715
[52] U.S. Cl. ................................. 514/54; 514/23; 514/56; 514/59; 426/2
[58] Field of Search ................................. 426/2; 514/23, 514/54, 56, 59

[56] References Cited

U.S. PATENT DOCUMENTS

| | | | |
|---|---|---|---|
| 4,778,680 | 10/1988 | Hidaka et al. | 426/2 |
| 4,873,229 | 10/1989 | Deya et al. | 514/54 |
| 4,902,674 | 2/1990 | Speights et al. | 514/23 |
| 4,927,811 | 5/1990 | Quarles | 514/23 |
| 4,987,127 | 1/1991 | Speights et al. | 514/23 |
| 5,034,064 | 7/1991 | Deya et al. | 127/46.3 |
| 5,218,096 | 6/1993 | Shibuya et al. | 536/41 |

FOREIGN PATENT DOCUMENTS

| | | |
|---|---|---|
| 0435657 | 12/1990 | European Pat. Off. . |
| 435657 | 7/1991 | European Pat. Off. . |
| 0549478 | 6/1993 | European Pat. Off. . |
| 60-34134 | 2/1985 | Japan . |
| 60-251896 | 12/1985 | Japan . |
| 62-138147 | 6/1987 | Japan . |
| 62-292791 | 12/1987 | Japan . |
| 63-109789 | 5/1988 | Japan . |
| 3-27255 | 2/1991 | Japan . |
| 04121185 | 4/1992 | Japan . |
| 9207947 | 5/1992 | WIPO . |

OTHER PUBLICATIONS

Coon et al. *Poultry Science* vol. 69(5), pp. 787–793, (1990).
Campbell et al. *Canadian J. of Ani. Sci* vol. 72(3), pp. 449–466, (1992).
Zobac et al. *Zivocisna Vyroba* vol. 37, pp. 777–784, (1992).
Coon et al. *Animal Feed and Technology* vol. 41, pp. 73–78, (1993).
Derwent Publications Ltd. AN 94–088610 & JPA 6 038 706, dated Feb. 15, 1994.
Derwent Publication Ltd. AN94–245301 & JPA 6 178 654, dated Jun. 1994.

*Primary Examiner*—John Kight
*Assistant Examiner*—Howard C. Lee
*Attorney, Agent, or Firm*—Sughrue, Mion, Zinn, Macpeak & Seas

[57] ABSTRACT

A feed for domestic fowls which comprises a galacto-oligosaccharide composition which is prepared by heat-treating lactose in the presence of a mineral acid; or by adding an inorganic acid to lactose and then heat-treating the resulting mixture using an extruder. The feed serves to inhibit the formation of fatty liver, to improve the meat quality and the rate of egg laying, to improve the eggshell strength and to reduce the cholesterol content in the egg.

5 Claims, No Drawings

FEED CONTAINING GALACTO-OLIGOSACCHARIDES FOR DOMESTIC FOWLS

BACKGROUND OF THE INVENTION

The present invention relates to a feed for domestic fowls and more specifically to a feed for domestic fowls which can improve the lipometabolism of fowls and inhibit the formation of fatty liver to thus improve the meat quality and which permits the reduction of the cholesterol content in eggs and can improve the egg-laying rate and the eggshell strength.

It has been a recent tendency to make the formula feeds for fowls more thick (so-called thickened feeds) or increase the content of proteins and make them calorific for the improvement of the efficiency thereof. Thus, fowls take energy more than the required energy intake and accordingly, there is a sign of frequent incidence of abnormalities in lipometabolism such as excess accumulation of fats in, for instance, peritoneal cavity, intestinal tracts and hypodermis or formation of fatty liver. This accordingly leads to reduction in the performance of meat production (inclusive of viscus meat) in case of the chicken breed and reduction in the egg-laying rate and in the rate of cracked eggs due to reduction in the eggshell strength in case of the egg breed.

Recently, eating habits have been improved and on the other hand, the diseases of adult people have become a matter of great concern, in particular, arterial scleroses have widely been recognized. Cholesterols derived from foods have been known as causative substances of arterial scleroses. Recent investigations have proved that there is a positive correlation between the quantity of cholesterols taken in the form of foods and the content thereof in the serum. Moreover, it has also been recognized that a positive correlation is observed between the quantity of cholesterols taken in the form of foods and the mortality rate of cardiopathy due to arterial scleroses and it has been proved that the mortality rate of cardiopathy due to arterial scleroses increases as the amount of cholesterols taken in the form of foods increases.

The fowl egg is a representative example of foods having high contents of cholesterols. The amounts of various foods taken and the mortality rate of cardiopathy were examined on adult male people of 55 to 59-year-old and it was proved that there was a significant positive correlation between the amount of fowl egg-intake and the mortality rate of cardiopathy (r=0.666). Nevertheless, the fowl egg is an excellent nutrient substance as a source of high quality protein, is a food desirably taken at least one per day and accordingly, there has been desired for the development of a technique allowing the reduction of the cholesterol content in the fowl egg.

Under such circumstances, there has been proposed an attempt which comprises adding, for instance, middle chain fatty acids, unsaturated fatty acids, amino acids and/or vitamins to feeds for domestic fowls in order to prevent accumulation of fats in the fowl body and to thus inhibit the formation of fatty liver. However, most of these substances are expensive and are not practically used as additives for the feed. Furthermore, there is a strong suspicion that chemical substances remaining in the meat and eggs of fowls may adversely affect the human body. Accordingly, the use of, in particular, synthetic chemical substances is not preferred from the viewpoint of such problem of safety. Thus, there has been desired for the development of cheap and effective feeds for domestic fowls.

On the other hand, there has recently been proposed a method in which oligosaccharides are incorporated into feeds for domestic animals for treating domestic animals suffering from, for instance, diarrhea and loose passage. There have been proposed, for instance, a feed comprising fructo-oligosaccharide (Japanese Un-examined Patent Publication (hereunder referred to as "J.P. KOKAI") No. Sho 60-34134) and a feed comprising galactosyl-lactose (J.P. KOKAI No. Sho 62-138127). Moreover, J.P. KOKAI No. Hei 3-27255 suggests the usefulness of isomalto-oligosaccharide.

Processes for preparing galactosyl-lactose from lactose as a starting material is disclosed in, for instance, J.P. KOKAI No. Sho 60-251896 which comprises treating lactose with microorganisms belonging to the genus Cryptococous to give an oligosaccharide having a ratio of glucose to galactose ranging from 1:2 to 1:5. Moreover, J.P. KOKAI No. Sho 63-109789 discloses a process for preparing an oligosaccharide having a ratio of glucose to galactose ranging from 1:2 to 1:5 by treating lactose with β-galactosidase. The oligosaccharides prepared through the foregoing processes each has up to 2% by weight of glucose residues on the nonreducing termini.

Nevertheless, these oligosaccharides have common drawbacks. More specifically, they are prepared by an enzymatic reaction, the reaction system is an aqueous system having a relatively low concentration and saccharides as effective components are produced in a low yield on the order of about 55% by weight on the basis of the weight of the whole solid contents. Moreover, the product contains large quantities of monosaccharides and disaccharides, and comprises the oligosaccharides as effective components having low molecular weights which thus make the crystallization thereof difficult. For this reason, they are in general distributed in the form of syrup. However, the syrup is difficult to uniformly distribute on feeds and accordingly, the product is desirably distributed and used in the form of powder, but preparation of a powdery product requires use of some additives. Otherwise, the powder obtained is highly hygroscopic, susceptible to blocking and deliquescence and difficult to handle. J.P. KOKAI No. Hei 3-27255 discloses an improved process wherein a silicate compound is used as a basic material for powdering isomalto-oligosaccharides, but even in this case, the content of effective oligosaccharides is as low as about 20 to 25% by weight. Thus the drawbacks of the prior-art saccharides result in increases in cost, and it is desired to develop an effective feed which can be produced while reducing the cost.

SUMMARY OF THE INVENTION

Accordingly, an object of the present invention is to provide a feed for domestic fowls which is effective over the entire breeding period of the fowl and which can prevent, in particular, accumulation of fats in the fowl body and the formation of fatty liver to thus improve the meat quality, to reduce the content of cholesterols in eggs and to improve the egg-laying rate and the eggshell strength.

The inventors of this invention have conducted various studies to solve the foregoing problems associated with the conventional techniques, have found out that the foregoing object of the invention can effectively be achieved if a specific galacto-oligosaccharide composition is incorporated into a basal feed for domestic fowls and thus have completed the present invention.

According to the present invention, there is provided a feed for domestic fowls comprising a galacto-oligosaccharide composition which comprises glucose and galactose as essential saccharide components and has a ratio of glucose to galactose of about 1:1.

DESCRIPTION OF THE PREFERRED EMBODIMENTS

The feed for domestic fowls of the present invention will hereunder be explained in more detail.

The term "galacto-oligosaccharide composition" herein used means a saccharide composition prepared by heat-treating lactose in the presence of a mineral acid and a small amount of water on the order of not more than 20% by weight, comprising glucose and galactose as essential saccharide components and having a ratio of glucose to galactose of about 1:1.

The galacto-oligosaccharide composition added to the feed for domestic fowls according to the present invention can be prepared by adding a mineral acid such as hydrochloric acid, sulfuric acid, nitric acid or phosphoric acid, preferably hydrochloric acid, to lactose in an amount of 250 to 1500 ppm, preferably about 500 ppm and heat-treating the reaction mixture preferably at a temperature ranging from 100° to 200° C. for 1 to 20 seconds.

A specific example of the method for preparing galacto-oligosaccharides is disclosed in, for instance, J.P. KOKAI No. Hei 3-197490. This publication discloses two processes, one of which comprises heating lactose in an anhydrous condition in the presence of an inorganic acid, and the other of which comprises adding an inorganic acid to an aqueous solution of lactose, then spray-drying the mixture to obtain dry powder and thereafter heating the powder. However, the galacto-oligosaccharide composition obtained by the latter process has a content of trisaccharide and higher saccharides of about 20% by weight and accordingly, the product cannot sufficiently ensure the desired effect of the present invention. Moreover, the method in which the lactose is spray-dried prior to the heat-treatment requires the use of a spray-dryer, include a number of steps, is thus complicated and accordingly, is economically unfavorable.

The galacto-oligosaccharide composition incorporated into the feed for domestic fowls of the invention can be prepared by the foregoing methods, but preferably prepared by adding an inorganic acid, preferably hydrochloric acid to lactose and then heat-treating the resulting mixture using an extruder. This method permits an increase in the content of effective saccharides, i.e., trisaccharide and higher saccharides up to 50 to 80% by weight.

The lactose used as the starting material for the galacto-oligosaccharide incorporated into the feed of the present invention may be any commercially available α-lactose, β-lactose and spray dried lactose. Extruders usable herein are, for instance, single screw extruders each comprising a single rotatable screw inserted in a cylinder and twin screw extruders each comprising two rotative screws in the same direction or opposite directions and inserted in cylinders having an 8-shaped cross section. The screw or screws are generally demountable, and may have various type of pitches inclusive of reverse pitches, which may be arbitrarily combined. Usually, a raw material is fed to the extruder at one end of the rotatable screw while the cylinder is heated, and is treated with heating under pressure, while making use of the heat of friction between the screw and the raw material. The pressure during heating is not restricted to a specific range, but in general ranges from 0 to 30 atm. as determined at the outlet of the extruder. The extruder used in the production of the galacto-oligosaccharide composition of the invention generally has such a size that the screw is 30 to 340 mm in diameter and that the ratio of the length to the diameter of the screw ranges from about 10:1 to 45:1. They are heated with steam, or by electrical heating or induction heating.

The extruder is operated at a temperature ranging from 100° to 200° C., preferably 160° to 180° C. for 5 to 20 seconds, preferably about 10 seconds. If the extruder is used as a reactor, it is an essential requirement that the material and the product be able to be smoothly moved through the extruder. Accordingly, the rotational speed of the screw is closely connected with the characteristic properties of the starting lactose, heating temperature, reaction time and the added amount of an acid and thus the product must be inspected for the saccharide composition to select optimum conditions for operating the extruder, but it is in general sufficient to adjust the rotational speed of the screw to a range of from 120 to 400 rpm.

The heat treatment with the use of an extruder used in the invention permits the practice of the reaction of lactose in a molten state in the presence of an inorganic acid. For this reason, the heat-treated product is in an amorphous state capable of being easily pulverized, since the product in a molten state under pressure is discharged from the extruder into the atmosphere. Accordingly, the galacto-oligosaccharide composition in a powdery state can easily be obtained by, if necessary, lightly crushing the product. In the conventional method, however, it is often observed that the lactose heat-treated is still in the powdery condition like the untreated one or is in almost crystalline state or is molten and solidified into a glasslike solid mass. However, the heat-treating method with the use of an extruder never suffers from such drawbacks.

The mineral acid, e.g., hydrochloric acid in the form of an aqueous solution, is added to lactose in an amount, for instance, ranging from 2 to 10% by weight and preferably about 5% by weight on the basis of the weight of the lactose when an about 1% aqueous solution thereof is used. To ensure uniform mixing of lactose and the mineral acid, the mixture is stirred in a mixer, aged and, if desired, dried at 100° to 120° C. for 0.5 to one hour in advance to reduce the moisture content to about 2 to 15% by weight, before treating the mixture in an extruder. Then the mixture is heat-treated while continuously feeding it to the extruder heated in advance and the product discharged through the outlet of the extruder is rapidly cooled to complete the heat-treatment.

Generally, the higher the reaction temperature, the higher the content of trisaccharide and higher saccharides in the resulting oligosaccharide composition, but the use of an extremely high temperature is not preferred, since the amount of colored substances formed during the treatment starts to increase at about 180° C. Accordingly, the reaction temperature is 120° to 200° C. and preferably 130° to 180° C.

The galacto-oligosaccharide composition prepared by the foregoing method is commercially available. Examples of such commercially available composition include "Pinelacto" (trade name of the product available from Matsutani Chemical Industries Co., Ltd.). The galacto-oligosaccharide composition has a content of trisaccharide and higher saccharides ranging from 40 to 50% by weight, a content of glucose residues on the nonreducing termini ranging from 15 to 30% by weight and an average molecular weight of about 650. Conventional formula feeds for domestic fowls comprise crude fibers in the form of indigestible polysaccharides in an amount ranging from about 3 to 6% by weight, but the crude fibers are insoluble in water. On the other hand, the galacto-oligosaccharide composition used in the invention is soluble in water and thus substantially differs from the conventionally known water-insoluble indigestible polysaccharides.

The amount of the galacto-oligosaccharide composition to be added to the feed for domestic fowls desirably ranges from 0.1 to 5% by weight on the basis of the total weight of the feed. If the amount of the galacto-oligosaccharide composition is less than 0.1% by weight, the resulting feed does not satisfactorily exhibit the desired effects of the present invention. Moreover, the use thereof in an amount of more than 5% by weight does not show further significant improvement in the effects and is not favorable from the economical standpoint.

The galacto-oligosaccharide composition used in the invention preferably comprises not less than 10% by weight and not more than 30% by weight of glucose residues on the nonreducing termini. This is because, if the glucose residue content is beyond the range defined above, the desired effects of the present invention cannot be ensured.

The feed for domestic fowls of the invention can be obtained by adding the galacto-oligosaccharide composition to a basal feed and mixing them, but the method for the addition thereof is not critical. For instance, the galacto-oligosaccharide composition may be added by distributing or spraying a liquid containing the composition on the basal feed; or mixing the basal feed with the added galacto-oligosaccharide composition in a powdery state, with the latter method being preferred because it is easily practicable. The feed for domestic fowls of the present invention can be used irrespective of, for instance, the kinds of domestic fowls, daily ages, methods for feeding and breeding and accordingly can be applied to the usual poultry farming method.

The feed for domestic fowls comprising the galacto-oligosaccharide composition of the present invention is effective over the entire breeding period of the fowl, can prevent, in particular, accumulation of fats in the fowl body and hence formation of fatty liver to thus improve the meat quality, to reduce the content of cholesterols in eggs and to improve the egg-laying rate and the eggshell strength.

The present invention will hereunder be explained in more detail with reference to the following non-limitative working Examples. Moreover, the effects practically attained by the invention will also be discussed in detail. In the following Examples, the inspection of the galacto-oligosaccharide for the kinds of saccharides, the cholesterol contents in the liver and the fowl egg and the triglyceride content in the liver are determined according to the methods detailed below:

[Method of Inspecting Galacto-oligosaccharide for the Kinds of Saccharides Present Therein]

A 10% by weight aqueous solution of a galacto-oligosaccharide composition prepared is passed through a column packed with 2:1 (volume ratio) mixture of ion exchange resins (Amberlite IRA900 and 200C) at an S.V. of 1 to thus desalt the composition. Then the concentration of the solution is adjusted to 5° Bx and filtered through a filter having a pore size of 0.2 μm before subjecting the solution to high performance liquid chromatography (HPLC). The HPLC procedure is performed under the following conditions.

| | |
|---|---|
| Column Used: | MCI GEL CK08EC 300 mm × 8 φ |
| Temperature of Column: | 85° C. |
| Eluent: | water |
| Detector: | differential refractometer |

A dextrin ("Pinedex #3" DE 25 available from Matsutani Chemical Industries Co., Ltd.) is used as a reference substance and the weight ratio of saccharide components present in a sample is calculated based on the area of each peak for mono-, di-, or tri- and higher saccharides.

[Quantitative Analysis of Cholesterol in Liver]

This method comprises accurately weighing out about 0.1 g of tissue slices of a sample liver, introducing them into a test tube, adding 2 ml of a 45% by weight aqueous potassium hydroxide solution, heating at 120° C. for one hour in an autoclave, then cooling, adding 2 ml of ethanol, sufficiently stirring in a homomixer, adding 5 ml of n-hexane, stirring for additional 2 minutes, dispensing 1 ml of the hexane phase into another test tube, evaporating the hexane, adding 0.5 ml of isopropyl alcohol, quantitatively determining the amount of cholesterol by the enzyme method and calculating the cholesterol content in the liver sample according to the following equation:

Cholesterol Content in Liver (mg/g)=[measured value (mg/dl)× 0.5×5]/[100×weight of the sample liver (g)]

[Quantitative Analysis of Triglyceride in Liver]

This method comprises accurately weighing out about 0.1 g of liver tissue slices which are cut into tiny pieces with a razor blade, introducing them into a test tube, adding 5 ml of isopropyl alcohol, allowing to stand for 5 minutes, stirring for 3 minutes in a homomixer to extract lipids present therein, centrifuging 10 minutes at 3000 rpm, quantitatively determining the amount of triglyceride present in the supernatant liquid by the enzyme method and calculating the triglyceride content in the liver sample according to the following equation:

Triglyceride Content in Liver (mg/g)=[measured value (mg/dl))×5] /[100×weight of the liver sample (g)]

[Quantitative Analysis of Cholesterol in Fowl Egg]

The yolk is weighed, lyophilyzed and then pulverized. At this stage, the loss in weight on drying is recorded. The lyophilized sample (about 0.5 g) and sea sand (1 g) are introduced into a 50 ml volume graduated flask. To the mixture, there are added 20 ml of a 0.5 mole/l alcoholic KOH solution and 10 ml of isopropyl alcohol, followed by heating at 60° C. for 80 minutes in warmed water, cooling down to room temperature, addition of isopropyl alcohol to a total volume of 50 ml, filtration, quantitative inspection of the resulting transparent solution as a specimen for the amount of cholesterol present therein and calculating the cholesterol content in the sample liver according to the following equation:

Cholesterol Content in Yolk (mg/g)=[measured value (mg/dl)]× (49.6/E)×(100-M)/100 wherein E means the weight of the lyophilized sample (g) and M means the loss in weight on drying (%).

EXAMPLE 1

In this Example, fowls belonging to 3-way cross fowls [white Plymouth rock species ♂×(Satsuma fowl ♂×Nagoya Species ♀)] which were 110-day-old and which had been put to grassland were used as sample fowls. Ten female fowls were divided into two groups each comprising 5 fowls and each fowl was fattened in an open cage-single pen for 14 days. These fowls of each group were fattened up by feeding, during the fattening period, them with a feed of the present invention comprising a feed for broiler finishing (trade name: Super Final; available from Showa Sangyo Co., Ltd.) having a mixing ratio shown in Table 1 and a composition shown in Table 2 and 5% by weight of a galacto-oligosaccharide (available from Matsutani Chemical Industries Co., Ltd. under the trade name of Pinelacto) or the feed for broiler finishing per se (control group) for the purpose of comparison.

TABLE 1

| Kinds of Raw Materials | Mixing Ratio | Raw Materials |
|---|---|---|
| Cereals | 70% | corn, milo |
| Vegetable Oil Meal | 17% | soybean oil meal, corn gluten meal |
| Animal Feed | 8% | fish meal, meat/bone meal |
| Other Materials | 5% | animal oil and fats, lecithin for feed, common salt, calcium carbonate |
| Feed Additives | | vitamin A, vitamin $D_3$, vitamin E, pantothenic acid, folic acid, vitamin $B_{12}$, vitamin $K_3$, vitamin $B_1$, vitamin $B_2$, vitamin $B_6$, nicotinic acid, choline, manganese sulfate, iron sulfate, copper sulfate, zinc sulfate, cobalt sulfate, potassium iodate, methionine, lysine, ethoxyquin |

TABLE 2

| Component | Amount |
|---|---|
| Crude Protein | not less than 18.0% |
| Crude Fat | not less than 5.0% |
| Crude Fiber | not more than 4.0% |
| Crude Ash | not more than 7.0% |
| Calcium | not less than 0.70% |
| Phosphorus | not less than 0.55% |
| Metabolic Energy/Kg | not less than 3200 Kcal |

After completion of the fattening period, the fowl samples were inspected for the gain of body weight, the amount of feed intake, the weight of the liver, the rate (%) of the liver weight with respect to the body weight, the degree of fatty liver (Fat Liver Score: FLS; 5-stage evaluation according to the color model) and the triglyceride value (TG) in the serum. The results thus obtained are summarized in the following Table 3.

TABLE 3

| Items Determined | Feed of the Invention | Comparative Feed |
|---|---|---|
| Gain of Body Weight (g) | 468 | 434 |
| Amount of Feed Intake (g) | 2140 | 2000 |
| Weight of Liver (g) | 61.8 | 72.4 |
| Rate of Liver Weight/Body Weight (%) | 2.3 | 2.5 |
| FLS | 3.8 | 4.2 |
| TG in Serum (mg/dl) | 641 | 671 |

As seen from the results listed in Table 3, the group fed with the galacto-oligosaccharide composition-containing feed of the invention had a low liver weight, hence a low rate (%) of the liver weight with respect to the body weight, a low FLS value and hence a low degree of fat-accumulation and a low triglyceride value in the serum as compared with those observed for the group fed with the usual feed free of the galacto-oligosaccharide composition although the gain of body weight and the amount of feed intake were identical to those for the control group. The low triglyceride value in the serum indicates that the lipid-metabolism of the fowls was improved and that the indigestible dextrin permitted the prevention of the fowls from suffering from hyperlipidemia.

EXAMPLE 2

In this Example, fowls belonging to 3-way cross fowls [white Plymouth rock species ♂×(Satsuma fowl ♂×Nagoya Species ♀)] which were 28-day-old and which had been crate-fattened were used as sample fowls. Male or female chicks (20 chicks each) were divided into two groups each comprising 10 chicks and fattened according to the windowless-floor feeding for 84 days. These chicks of each group were fattened up by feeding, during the fattening period, them with a feed of the present invention comprising a feed for the latter period-broiler (trade name: Super Pro A; available from Showa Sangyo Co., Ltd.) having a mixing ratio shown in Table a and a composition shown in Table 2 or a feed for broiler finishing used in Example 1 and 5% by weight of the galacto-oligosaccharide composition (Pinelacto) or either of the feeds free of the galacto-oligosaccharide composition (control groups) for the purpose of comparison.

TABLE 4

| Kinds of Raw Materials | Mixing Ratio | Raw Materials |
|---|---|---|
| Cereals | 70% | corn, milo |
| Vegetable Oil Meal | 17% | soybean oil meal, corn gluten meal |
| Animal Feed | 8% | fish meal, meat/bone meal |
| Other Materials | 5% | animal oil and fats, lecithin for feed, common salt, calcium carbonate |
| Feed Additives | | nosiheptide, sodium salinomycin, vitamin A, vitamin $D_3$, vitamin E, pantothenic acid, folic acid, vitamin $B_{12}$, vitamin $K_3$, vitamin $B_1$, vitamin $B_2$, vitamin $B_6$, nicotinic acid, choline, manganese carbonate, iron sulfate, copper sulfate, zinc carbonate, cobalt sulfate, calcium iodate, methionine, lysine, ethoxyquin |

After completion of the fattening period, the fowl samples were inspected for the gain of body weight, the amount of feed intake, the weight of the liver, the rate (%) of the liver weight with respect to the body weight, the degree of fatty liver (Fat Liver Score: FLS; 5-stage evaluation according to the color model, b value determined by a color difference meter), the triglyceride value (TG) in the serum and the fat contents in the liver, breast meat and dark meat (Soxhlet: SL value; EM scan: EM value). The results thus obtained are summarized in the following Table 5.

TABLE 5

| Items Determined | Feed of the Invention | Comparative Feed |
|---|---|---|
| Gain of Body Weight (g) | 2996 | 2889 |
| Amount of Feed Intake (g) | 9288 | 8667 |
| Weight of Liver (g) | 47.0 | 55.5 |
| Rate of Liver Weight/Body Weight (%) | 1.6 | 1.8 |

TABLE 5-continued

| Items Determined | Feed of the Invention | Comparative Feed |
|---|---|---|
| FLS | 2.5 | 3.5 |
| b Value | 9.4 | 11.4 |
| TG in Serum (mg/dl) | 61 | 84 |
| Fats in Liver (%) | 4.0 | 8.8 |
| Soxhlet Value (%) | | |
| breast meat with the skin | 14.4 | 16.3 |
| dark meat with the skin | 17.6 | 17.9 |
| EM Scan Value (%)*[1] | | |
| breast meat with the skin | 13.0 | 15.5 |
| dark meat with the skin | 17.1 | 19.9 |

*[1]: Calculated on the basis of a regression formula.

As seen from the results listed in Table 5, the group fed with the galacto-oligosaccharide composition-containing feed of the invention had a low liver weight, hence a low rate (%) of the liver weight with respect to the body weight, low FLS and b values and hence a low degree of fatty liver and a low triglyceride value in the serum as compared with those observed for the control groups fed with the usual feed free of the galacto-oligosaccharide composition although the gain of body weight and the amount of feed intake are approximately identical to those for the control groups.

Male and female fowls fattened in Example 2 (5 animals each) were inspected for the amounts of cholesterol and triglyceride present in the liver. The results thus obtained are summarized in the following Table 6.

TABLE 6

| Items Determined | | Feed of the Invention | Comparative Feed |
|---|---|---|---|
| Male Fowls | | | |
| Cholesterol | mg/g | 3.09* | 3.54 |
| | mg/liver | 155* | 208 |
| Triglyceride | mg/g | 19.4 | 18.7 |
| | g/liver | 1.01 | 1.10 |
| Female Fowls | | | |
| Cholesterol | mg/g | 3.03 | 2.63 |
| | mg/liver | 132 | 128 |
| Triglyceride | mg/g | 34.3* | 100.4 |
| | g/liver | 1.51* | 5.74 |

The results listed in Table 6 indicate that the male group fed with the feed of the present invention and fattened in Example 2 exhibited a significant reduction of the cholesterol content in the liver, but did not show any significant change in the amount of triglyceride, while the female fowl group fed with the feed of the present invention did not show any significant change in the cholesterol content in the liver, but showed a significant reduction in the triglyceride content.

Then the quality of chicken was evaluated by sensory tests. Dark meat of two female fowls of each group was cut into about 2 cm square cubes, common salt was added in an amount of 1% per unit weight of the meat, heated on a frying pan till even the meat core changed its color to give a meat sample broiled with salt. The quality of the meat sample broiled with salt was examined by a sensory test whose panel comprised 23 panelists and evaluated according to 5-stage evaluation criteria and the results obtained were summarized in the following Table 7.

TABLE 7

| Items Examined | Feed of the Invention | Comp. Feed |
|---|---|---|
| Good smell | 0% | 0% |
| Palatability | 4.8% | 17.4% |
| Smooth and pleasant on the palate | 4.8% | 0% |
| Plain taste | 14.3% | 17.4% |
| Firm and resistant to the teeth | 19.0% | 8.7% |
| Being in prime of grease | 14.3% | 13.0% |
| Giving out a bad smell | 0% | 17.4% |
| Hard | 19.0% | 4.3% |
| Lacking in moisture | 9.5% | 8.7% |
| Soft | 9.5% | 8.7% |
| Others | 4.8% | 4.4% |
| Total Score | 69.5 | 68.5 |
| Average | 3.3 ± 0.8 | 3.3 ± 1.2 |

EXAMPLE 3

Chicks of ovum recovery-fowls (belonging to DEKALB XL-L (Delta); 24 chicks) were divided into two groups. The first group was fed with a commercially available formula feed (formula feed as a chick starter; available from Nippon Formula Feed Mfg. Co., Ltd.) having a mixing ratio shown in Table 8 and a composition shown in Table 9 up to 4-week-old; with a commercially available formula feed (formula feed for growing middle chicks; available from Nippon Formula Feed Mfg. Co., Ltd.) having a mixing ratio shown in-Table 10 and a composition shown in Table 11 during 5 to 10-week-old; with a commercially available formula feed (formula feed for feeding large chicks; available from Nippon Formula Feed Mfg. Co., Ltd.) having a mixing ratio shown in Table 12 and a composition shown in Table 13 during 11 to 20-week-old; and with a commercially available formula feed (formula feed for mature fowls; available from Nippon Formula Feed Mfg. Co., Ltd.) during 21 to 25-week-old.

On the other hand, the second group was fattened up to 25-week-old by feeding them with the foregoing feeds each of which comprised 5% by weight of a galacto-oligosaccharide composition (Pinelacto).

TABLE 8

| Kinds of Raw Materials | Mixing Ratio | Raw Materials |
|---|---|---|
| Cereals | 54% | corn, milo |
| Vegetable Oil Meal | 26% | soybean oil meal, corn germ meal, |
| Animal Feed | 7% | fish meal, meat/bone meal |
| Chaff and Bran | 7% | corn gluten feed |
| Other Materials | 5% | animal oil and fats, alfalfa meal, corn steep liquor, calcium carbonate, common salt |
| Feed Additives | | amprolium, ethopavate, virginiamycin, vitamin A, vitamin $D_3$, vitamin E, vitamin $K_3$, vitamin $B_1$, vitamin $B_2$, vitamin $B_6$, nicotinic acid, pantothenic acid, biotin, folic acid, vitamin $B_{12}$, choline, methionine, zinc carbonate, calcium iodate, cobalt sulfate, iron sulfate, copper sulfate, manganese sulfate, ethoxyquin |

TABLE 9

| Component | Amount |
| --- | --- |
| Crude Protein | not less than 20.3% |
| Crude Fat | not less than 2.5% |
| Crude Fiber | not more than 6.0% |
| Crude Ash | not more than 8.0% |
| Calcium | not less than 0.70% |
| Phosphorus | not less than 0.55% |
| Metabolic Energy/Kg | not less than 2900 Kcal |

TABLE 10

| Kinds of Raw Materials | Mixing Ratio | Raw Materials |
| --- | --- | --- |
| Cereals | 60% | corn, milo |
| Vegetable Oil Meal | 16% | soybean oil meal, corn germ meal, rapeseed oil meal |
| Animal Feed | 5% | fish meal, meat/bone meal |
| Chaff and Bran | 14% | corn gluten feed, rice bran |
| Other Materials | 5% | animal oil and fats, alfalfa meal, corn steep liquor, calcium carbonate, common salt |
| Feed Additives | | amprolium., ethopavate, sulfaquinosaline, virginiamycin, vitamin A, vitamin $D_3$, vitamin E, vitamin $K_3$, vitamin $B_1$, vitamin $B_2$, vitamin $B_6$, nicotinic acid, pantothenic acid, biotin, folic acid, vitamin $B_{12}$, choline, methionine, zinc carbonate, calcium iodate, cobalt sulfate, iron sulfate, copper sulfate, manganese sulfate, ethoxyquin |

TABLE 11

| Component | Amount |
| --- | --- |
| Crude Protein | not less than 17.0% |
| Crude Fat | not less than 2.5% |
| Crude Fiber | not more than 6.0% |
| Crude Ash | not more than 9.0% |
| Calcium | not less than 0.70% |
| Phosphorus | not less than 0.55% |
| Metabolic Energy/Kg | not less than 2770 Kcal |

TABLE 12

| Kinds of Raw Materials | Mixing Ratio | Raw Materials |
| --- | --- | --- |
| Cereals | 62% | corn, milo, cassava meal |
| Chaff and Bran | 15% | corn gluten feed, rice bran, wheat bran |
| Vegetable Oil Meal | 11% | soybean oil meal, corn germ meal, rapeseed oil meal |
| Animal Feed | 5% | fish meal, meat/bone meal |
| Other Materials | 7% | alfalfa meal, molasses, corn steep liquor, calcium carbonate, common salt |
| Feed Additives | | vitamin A, vitamin $D_3$, vitamin E, vitamin $K_3$, vitamin $B_1$, vitamin $B_2$, vitamin $B_6$, nicotinic acid, pantothenic acid, biotin, folic acid, vitamin $B_{12}$, choline, methionine, zinc carbonate, calcium iodate, cobalt sulfate, iron sulfate, copper sulfate, manganese sulfate, ethoxyquin |

TABLE 13

| Component | Amount |
| --- | --- |
| Crude Protein | not less than 14.0% |
| Crude Fat | not less than 2.5% |
| Crude Fiber | not more than 6.0% |
| Crude Ash | not more than 9.0% |
| Calcium | not less than 0.70% |
| Phosphorus | not less than 0.45% |
| Metabolic Energy/Kg | not less than 2730 Kcal |

After starting of the fattening, egg laying was initiated at about 20 weeks. Thereafter, the fowls were inspected for the rate of egg laying (number of eggs produced per day/number of bred fowls) up to 25 weeks at which the rate of egg laying was maximized, the averaged weight of the eggs produced, the eggshell strength (the magnitude of the load required for breaking each eggshell) and the content of cholesterol (mg/100 g yolk). The results thus obtained are summarized in the following Table 14.

TABLE 14

| Items Determined | Feed of the Invention | Comparative Feed |
| --- | --- | --- |
| Rate of Egg Laying (%) | 77.4 | 73.8 |
| Averaged Weight of Egg (g) | 54.6 | 52.4 |
| Eggshell Strength (Kg/cm$^2$) | 3.77 | 3.40 |
| Content of Cholesterol (yolk) | 1354 | 1431 |

As seen from the results listed in Table 14, the group fed with the galacto-oligosaccharide composition-containing feed of the invention had a rate of egg laying which was about 8% higher than that observed for the group fed with the comparative feed, the significantly increased eggshell strength ($P<0.05$) and a significantly reduced cholesterol content ($P<0.05$).

What is claimed is:

1. A method for preventing accumulation of fats in a domestic fowl body and the formation of fatty liver to thus improve the meat quality, to reduce the content of cholesterols in eggs and to improve the egg-laying rate and the egg shell strength which comprises feeding the fowls with a feed comprised of a basal feed and a galacto-oligosaccharide composition which mainly comprises glucose and galactose as saccharide components wherein (a) the galacto-oligosaccharide composition comprises not less than 40% by weight of trisaccharides and higher saccharides which have a glucose to galactose ratio of about 1:1, and (b) the galacto-oligosaccharide composition is prepared by heat-treating lactose in the presence of a mineral acid in an amount of 250 to 1500 ppm and in the presence of water in an amount of 2 to 15% by weight based on the composition using an extruder.

2. The method according to claim 1, wherein the content of the galacto-oligosaccharide composition is from 0.1 to 5% by weight on the basis of the total weight of the basal feed and galacto-oligosaccharide composition.

3. The method according to claim 1, wherein the extruder is selected from single screw extruders each comprising a single rotatable screw inserted in a cylinder and twin screw extruders each comprising two rotative screws in the same direction or opposite directions and inserted in cylinders having an 8-shaped cross section.

4. The method according to claim 1, wherein the extruder is operated at a temperature of from 100° to 200° C. for 5 to 20 seconds.

5. The method according to claim 1, wherein the content of the galacto-oligosaccharide composition is from 0.1 to 5% by weight on the basis of the total weight of the basal feed and galacto-oligosaccharide composition.

* * * * *